(12) United States Patent
Morikawa et al.

(10) Patent No.: US 9,821,667 B2
(45) Date of Patent: Nov. 21, 2017

(54) BATTERY CONTROL SYSTEM AND VEHICLE CONTROL SYSTEM

(71) Applicants: HITACHI AUTOMOTIVE SYSTEMS, LTD., Hitachinaka-shi, Ibaraki (JP); NISSAN MOTOR CO., LTD., Yokohama-shi, Kanagawa (JP)

(72) Inventors: Hiroshi Morikawa, Hitachinaka (JP); Yoshinori Aoshima, Hitachinaka (JP); Masayuki Takada, Hitachinaka (JP); Kenichiro Tsuru, Hitachinaka (JP); Shigeyuki Kiyota, Kanagawa (JP); Yoshiyuki Tanaka, Kanagawa (JP); Toyoki Iguchi, Kanagawa (JP); Hiroaki Hashimoto, Kanagawa (JP); Yasuyuki Takahashi, Kanagawa (JP)

(73) Assignees: HITACHI AUTOMOTIVE SYSTEMS, LTD., Ibaraki (JP); NISSAN MOTOR CO., LTD., Kanagawa (JP)

( * ) Notice: Subject to any disclaimer, the term of this patent is extended or adjusted under 35 U.S.C. 154(b) by 98 days.

(21) Appl. No.: 14/909,473

(22) PCT Filed: Jul. 25, 2014

(86) PCT No.: PCT/JP2014/069733
§ 371 (c)(1),
(2) Date: Feb. 2, 2016

(87) PCT Pub. No.: WO2015/019875
PCT Pub. Date: Feb. 12, 2015

(65) Prior Publication Data
US 2016/0185238 A1 Jun. 30, 2016

(30) Foreign Application Priority Data
Aug. 9, 2013 (JP) ................................ 2013-166801

(51) Int. Cl.
H02J 7/00 (2006.01)
H02J 7/04 (2006.01)
(Continued)

(52) U.S. Cl.
CPC ......... B60L 11/1803 (2013.01); B60L 3/0046 (2013.01); B60L 7/14 (2013.01);
(Continued)

(58) Field of Classification Search
CPC ..................................................... H02J 7/007
(Continued)

(56) References Cited

U.S. PATENT DOCUMENTS 3,617,851 A 11/1971 Du Puy et al.
9,170,304 B2 * 10/2015 Nukui ................ G01R 31/3648
(Continued)

FOREIGN PATENT DOCUMENTS

CN 101340107 A 1/2009
CN 101627519 A 1/2010
(Continued)

OTHER PUBLICATIONS

The Extended European Search Report dated Apr. 5, 2017 in the EP Application No. 14834630.7.
(Continued)

*Primary Examiner* — Edward Tso
*Assistant Examiner* — Ahmed Omar
(74) *Attorney, Agent, or Firm* — Volpe and Koenig, P.C.

(57) ABSTRACT

A battery control system connected to a battery, which controls charge/discharge at the battery, includes: a current detection unit that measures a current value by detecting a charge/discharge current flowing through the battery; a voltage detection unit that detects a voltage at the battery; a temperature detection unit that detects a temperature at the battery; an effective current value calculation unit that
(Continued)

calculates, based upon the current value measured by the current detection unit, an effective current value in a predetermined time window; a time ratio calculation unit that determines a time ratio indicating a ratio of a length of time over which the effective current value has been in excess of a predetermined allowable value during a predetermined specified time period; and a charge/discharge restriction unit that restricts the charge/discharge current based upon the time ratio determined by the time ratio calculation unit.

6 Claims, 7 Drawing Sheets

(51) Int. Cl.
    *H02J 7/16*         (2006.01)
    *B60L 11/18*       (2006.01)
    *H01M 10/44*      (2006.01)
    *B60L 3/00*         (2006.01)
    *B60L 7/14*         (2006.01)
    *B60L 11/00*       (2006.01)
    *H01M 10/42*      (2006.01)

(52) U.S. Cl.
    CPC ......... *B60L 11/005* (2013.01); *B60L 11/1857* (2013.01); *B60L 11/1861* (2013.01); *B60L 11/1864* (2013.01); *H01M 10/425* (2013.01); *H01M 10/44* (2013.01); *H02J 7/00* (2013.01); *H02J 7/007* (2013.01); *H02J 7/04* (2013.01); *B60L 2240/545* (2013.01); *B60L 2240/547* (2013.01); *B60L 2240/549* (2013.01); *B60L 2240/80* (2013.01); *Y02T 10/7011* (2013.01); *Y02T 10/7016* (2013.01); *Y02T 10/7022* (2013.01); *Y02T 10/7044* (2013.01); *Y02T 10/7061* (2013.01)

(58) Field of Classification Search
    USPC ......................................................... 320/134
    See application file for complete search history.

(56) References Cited

U.S. PATENT DOCUMENTS

| | | | |
|---|---|---|---|
| 2004/0220758 A1* | 11/2004 | Barsoukov | G01R 31/361 702/63 |
| 2008/0278111 A1 | 11/2008 | Genies et al. | |
| 2009/0256524 A1 | 10/2009 | Nukui | |
| 2010/0070133 A1 | 3/2010 | Ishishita | |
| 2012/0091971 A1 | 4/2012 | Syed et al. | |
| 2012/0098497 A1 | 4/2012 | Ogane et al. | |
| 2013/0033790 A1 | 2/2013 | Kobayakawa et al. | |
| 2013/0107404 A1 | 5/2013 | Hamai | |
| 2014/0070770 A1 | 3/2014 | Nogi et al. | |

FOREIGN PATENT DOCUMENTS

| | | |
|---|---|---|
| DE | 10 2011 054 144 A1 | 4/2012 |
| DE | 10 2011 012818 A1 | 9/2012 |
| DE | 10 2012 219 026 A1 | 5/2013 |
| JP | 2009-207312 A | 9/2009 |
| JP | 2010-226894 A | 10/2010 |
| JP | 2011-229318 A | 11/2011 |
| JP | 2012-013472 A | 1/2012 |
| JP | 2012-044844 A | 3/2012 |
| JP | 2013-027209 A | 2/2013 |
| JP | 2013-051115 A | 3/2013 |
| RU | 127 521 U1 | 4/2013 |
| WO | 2012/111679 A1 | 8/2012 |

OTHER PUBLICATIONS

Russian Search Report dated Mar. 23, 2017 in the Russian Application No. 2016103957.
Chinese Office Action dated Aug. 14, 2017 for the Chinese Application No. 201480044134.1.

* cited by examiner

FIG.7

| | CURRENT TIME POINT | 1 HOUR PREVIOUS | 2 HOURS PREVIOUS | 3 HOURS PREVIOUS | 4 HOURS PREVIOUS | 5 HOURS PREVIOUS | ... | 23 HOURS PREVIOUS | 24 HOURS PREVIOUS |
|---|---|---|---|---|---|---|---|---|---|
| EXCEED ALLOWABLE VALUE | | | × | | × | × | | × | × |

BATTERY CONTROL SYSTEM AND VEHICLE CONTROL SYSTEM

TECHNICAL FIELD

The present invention relates to a battery control system and a vehicle control system.

BACKGROUND ART

When a secondary battery such as a lithium-ion battery has been continuously discharged with a large current, the internal resistance value is bound to temporarily rise in much the same way or to an even higher level as the value rises when the battery becomes degraded, and under such circumstances, the battery can no longer perform at its full performance level. PTL1 discloses a battery control method devised to prevent such deterioration in the performance level, whereby an evaluation value, indicating the extent of battery degradation due to continuous battery discharge, is integrated and a restriction is imposed with regard to battery discharge if the integral value exceeds a predetermined allowable value.

CITATION LIST

Patent Literature

PTL1: Japanese Laid Open Patent Publication No. 2013-51115

SUMMARY OF INVENTION

Technical Problem

In the battery control method disclosed in PTL1, an evaluation value indicating the extent of battery degradation is calculated based upon the length of time having elapsed since the previous evaluation value calculation, the level of the discharge current and the like and a decision is made as to whether or not to restrict the battery discharge based upon the integral value obtained by integrating the evaluation value. However, when the battery is used frequently and is repeatedly charged and discharged over an extended period of time, the extent of battery degradation cannot be correctly assessed through the evaluation value calculation method described above and thus, a decrease in the battery performance cannot be reliably prevented.

Solution to Problem

According to the 1st aspect of the present invention, a battery control system connected to a battery, which controls charge/discharge at the battery, comprises: a current detection unit that measures a current value by detecting a charge/discharge current flowing through the battery; a voltage detection unit that detects, a voltage at the battery; a temperature detection unit that detects a temperature at the battery; an effective current value calculation unit that calculates, based upon the current value measured by the current detection unit, an effective current value in a predetermined time window; a time ratio calculation unit that determines a time ratio indicating a ratio of a length of time over which the effective current value has been in excess of a predetermined allowable value during a predetermined specified time period; and a charge/discharge restriction unit that restricts the charge/discharge current based upon the time ratio determined by the time ratio calculation unit.

According to the 2nd aspect of the present invention, in the battery control system according to the 1st aspect, it is preferred that the specified time period is at least 24 hours.

According to the 3rd aspect of the present invention, in the battery control system according to the 1st or the 2nd aspect, it is preferred that the charge/discharge restriction unit restricts the charge/discharge current when the time ratio is equal to or greater than 0.5.

According to the 4th aspect of the present invention, in the battery control system according to any one of the 1st through 3rd aspects, it is preferred that the charge/discharge restriction unit clears restriction on the charge/discharge current once a length of elapsed time having elapsed since the restriction on the charge/discharge current came into effect or a total length of time over which the restriction on the charge/discharge current has been in effect exceeds a predetermined restriction clearance time.

According to the 5th aspect of the present invention, in the battery control system according to the 4th aspect, it is preferred that: the battery control system is connected to an in-vehicle communication network; and the charge/discharge restriction unit obtains information pertaining to the length of elapsed time or the total length of time via the communication network According to the 6th aspect of the present invention, a vehicle control system comprises: a battery control system connected to a battery, which controls charge/discharge at the battery; and a vehicle control unit connected with the battery control system, wherein: the battery control system includes a current detection unit that measures a current value by detecting a charge/discharge current flowing through the battery, a voltage detection unit that detects a voltage at the battery, a temperature detection unit that detects a temperature at the battery and an effective current value calculation unit that calculates, based upon the current value measured by the current detection unit, an effective current value in a predetermined time window; and the vehicle control unit determines a time ratio indicating a ratio of a length of time over which the effective current value has been in excess of a predetermined allowable value during a predetermined specified time period and issues an instruction for the battery control system so as to restrict the charge/discharge current based upon the time ratio having been determined.

Advantageous Effect of Invention

According to the present invention, a decrease in the battery performance level can be reliably prevented even when the battery is used frequently and is repeatedly charged and discharged over an extended period of time.

DESCRIPTION OF EMBODIMENTS

The following is a description of an embodiment of the present invention, given in reference to drawings. The embodiment will be described below in reference to an example of the present invention adopted in a battery system configuring a power source in a hybrid vehicle (HEV).

In addition, while the embodiment will be described by assuming that the present invention is adopted in conjunction with lithium-ion batteries, the present invention may be otherwise adopted in conjunction with nickel hydrogen batteries, lead-acid batteries, electric double layer capacitors or hybrid capacitors. It is to be noted that while the assembled battery in the embodiment described below is configured by connecting battery cells in series, the assembled battery may instead be configured by connecting in series groups of battery cells each comprised of battery cells connected in parallel or the assembled battery may be configured by connecting in parallel groups of battery cells each comprised of battery cells connected in series.

Figure 1:
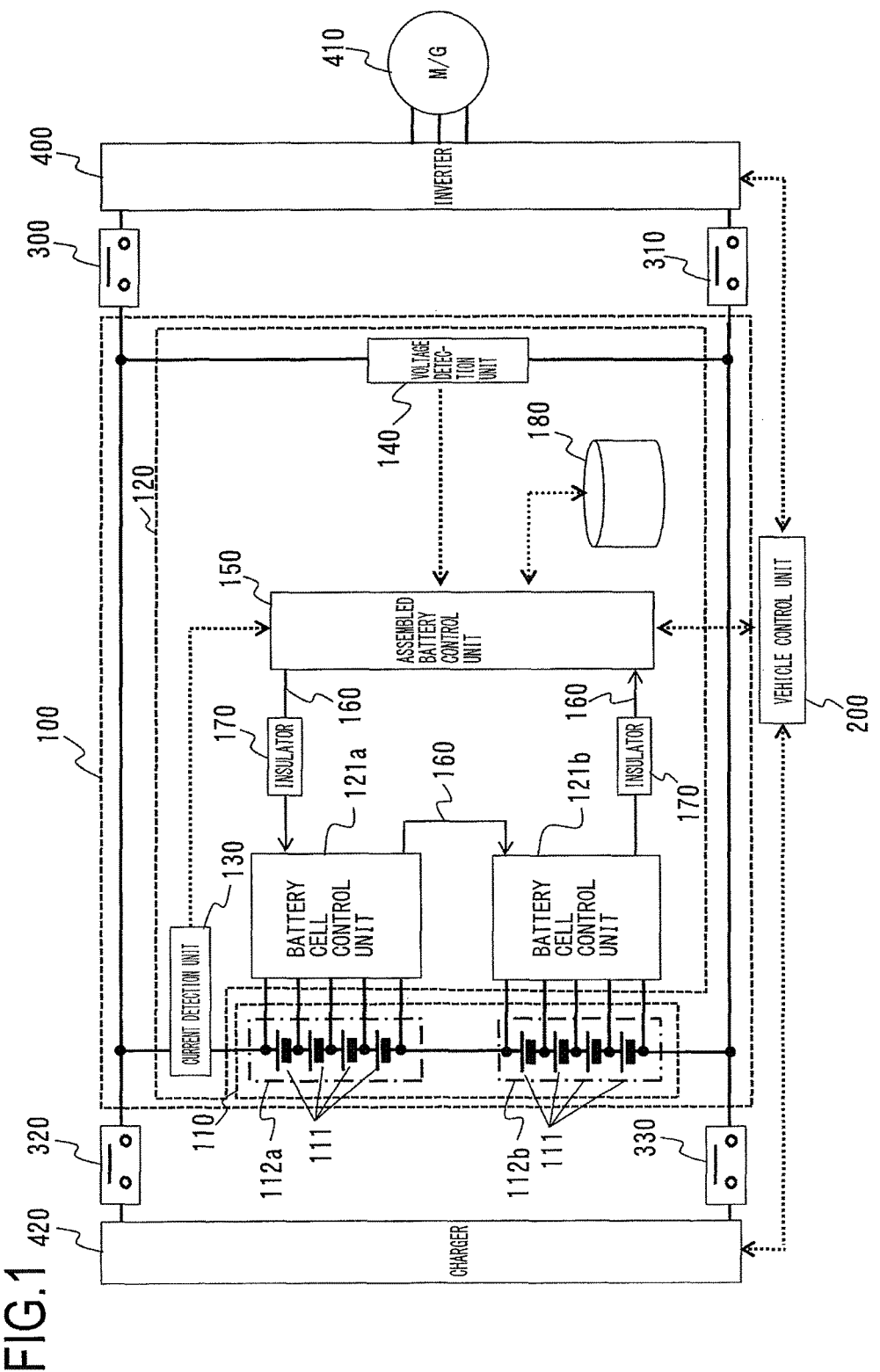
FIG. 1 A diagram showing a configuration comprising a battery system 100 that includes a battery control system 120 achieved in an embodiment of the present invention and peripheral devices FIG. 2 A diagram showing the circuit structure of the battery cell control unit 121a FIG. 3 A diagram presenting examples of relationships that may be achieved by the time window and the allowable value pertaining to the effective current in correspondence to varying levels of frequency with which a battery is utilized FIG. 4 A diagram presenting an example of a relationship that may be achieved by the number of battery operation cycles and the extent of degradation FIG. 5 A diagram showing the control blocks in the assembled battery control unit 150, which are involved in charge/discharge restriction FIG. 6 A flowchart of the processing executed for the charge/discharge restriction FIG. 7 An example of a decision-making results table

FIG. 1 is a diagram showing a configuration comprising a battery system 100 that includes a battery control system 120 achieved in an embodiment of the present invention and peripheral devices. The battery system 100 is connected to an inverter 400 via relays 300 and 310. The battery system 100 comprises an assembled battery 110 and the battery control system 120. The battery control system 120 includes battery cell control units 121a and 121b, a current detection unit 130, a voltage detection unit 140, an assembled battery control unit 150 and a storage unit 180.

The assembled battery 110 is configured by connecting in series battery cell groups 112a and 112b each made up with a plurality of battery cells 111. The battery cell control units 121a and 121b, which are respectively connected with the battery cell groups 112a and 112b, detect the cell voltages (voltages across the individual battery cells) and temperatures at the individual battery cells 111 in the corresponding battery cell groups and transmit signals indicating detection results to the assembled battery control unit 150 via signal communication paths 160 and insulator elements 170. It is to be noted that the insulator elements 170 may be constituted with, for instance, photo-couplers.

The current detection unit 130 detects the current flowing through the assembled battery 110 and measures the value of the current. The voltage detection unit 140 detects the voltage across the assembled battery 110, i.e., the voltage representing the total sum of the voltages at the battery cells 111 connected in series in the assembled battery 110.

Based upon the signals transmitted from the battery cell control units 121a and 121b, the assembled battery control unit 150 obtains the cell voltages and the temperatures at the individual battery cells 111. In addition, it individually receives the current value measured for the current flowing through the assembled battery 110 from the current detection unit 130 and the total voltage value for the assembled battery 110 from the voltage detection unit 140. Based upon the information thus received, the assembled battery control unit 150 detects conditions at the assembled battery 110 and controls the assembled battery 110 accordingly. The detection results indicating the conditions of the assembled battery 110 detected by the assembled battery control unit 150 are transmitted to a vehicle control unit 200 and to the battery cell control units 121a and 121b.

The assembled battery 110 is configured by electrically connecting in series a plurality of battery cells 111 capable of accumulating and releasing electric energy (capable of charging/discharging DC power). In order to facilitate management and control of the conditions at the battery cells 111 configuring the assembled battery 110, the battery cells 111 are divided into groups each made up with a predetermined unit number of cells. The battery cells 111 in each group are electrically connected in series and form the battery cell group 112a or 112b. It is to be noted that all the battery cell groups 112 may be made up with a uniform number of battery cells 111, or the number of battery cells 111 in a given battery cell group 112 may be different from the number of battery cells 111 in another battery cell group 112. For purposes of simplification, the embodiment will be described by assuming that the battery cell groups 112a and 112b, each formed by electrically connecting four battery cells 111 in series are electrically connected in series in the assembled battery 110 having a total of eight battery cells 111 as illustrated in FIG. 1.

The communication method adopted to enable the assembled battery control unit 150 to communicate with the battery cell control units 121a and 121b will be described next. The battery cell control units 121a and 121b are connected in series in an order conforming to the order in which the potentials at the battery cell groups 112a and 112b, respectively monitored by them, shift from high to low. A signal transmitted from the assembled battery control unit 150 is input to the battery cell control unit 121a via an insulator element 170 and a signal communication path 160. An output from the battery cell control unit 121a is input to the battery cell control unit 121b via a signal communication path 160. An output from the lowest-order battery cell control unit 121b is transmitted to the assembled battery control unit 150 via an insulator element 170 and a signal communication path 160. It is to be noted that while no insulator element is disposed between the battery cell control unit 121a and the battery cell control unit 121b in the embodiment, signals may be transmitted/received between these battery cell control units via an insulator element as well.

Various types of information required by the assembled battery control unit 150 for control of the assembled battery 110 are stored and held in the storage unit 180. For instance, information related to the state of charge (SOC) of each battery cell 111, information related to the internal resistance in each battery cell 111 and the like are stored in the storage unit 180.

The assembled battery control unit 150 executes various types of processing and arithmetic operations in order to control the assembled battery 110 by using information individually received from the battery cell control units 121a and 121b, the current detection unit 130, the voltage detection unit 140 and the vehicle control unit 200, the information stored in the storage unit 180 and the like. It executes, for instance, an arithmetic operation to determine the SOC or the state of health (SOH) of each battery cell 111, an arithmetic operation to determine the allowable power that can be charged/discharged at the assembled battery 110, decision-making with regard to any abnormality in the assembled battery 110 and an arithmetic operation for purposes of charge/discharge quantity control at the assembled battery 110. Then, based upon the arithmetic operation results, it outputs information needed for control of the assembled battery 110 to the vehicle control unit 200 and to the battery cell control units 121a and 121b. It is to be noted that the assembled battery control unit 150 and the vehicle control unit 200 are both connected to an in-vehicle communication network referred to as a CAN (controller area network) and are thus able to transmit/receive information to/from each other via the network.

The vehicle control unit 200 controls the inverter 400 connected to the battery system 100 via the relays 300 and 310 by using the information transmitted thereto from the assembled battery control unit 150. While the vehicle is in a traveling state, the battery system 100 is connected to the inverter 400. The inverter 400 drives a motor generator 410 with the energy stored in the assembled battery 110 in the battery system 100.

When the vehicle system, having the battery system 100 installed therein, is started up and enters a traveling state, the battery system 100 becomes connected to the inverter 400 under management executed by the vehicle control unit 200. The inverter 400 then uses energy stored in the assembled battery 110 to drive the motor generator 410. In a regenerative operation, on the other hand, the assembled battery 110 is charged with power generated at the motor generator 410.

As the battery system 100 becomes connected to a charger 420 via relays 320 and 330, the assembled battery 110 is charged with a charge current provided from the charger 420 until a predetermined condition is satisfied. The energy stored in the assembled battery 110 through the charge operation is utilized when the vehicle is next engaged in traveling operation and is also utilized for operation of electric components and the like installed at the interior and exterior of the vehicle. Furthermore, the energy may be released into an external power system, a typical example of which is a home power system, as necessary. It is to be noted that the charger 420 is installed in an external power system, typical examples of which include a home power system and a public charging station. As the vehicle, having installed therein the battery system 100, is connected to any of these power systems, the battery system 100 and the charger 420 become connected based upon information provided by the vehicle control unit 200.

Figure 2:
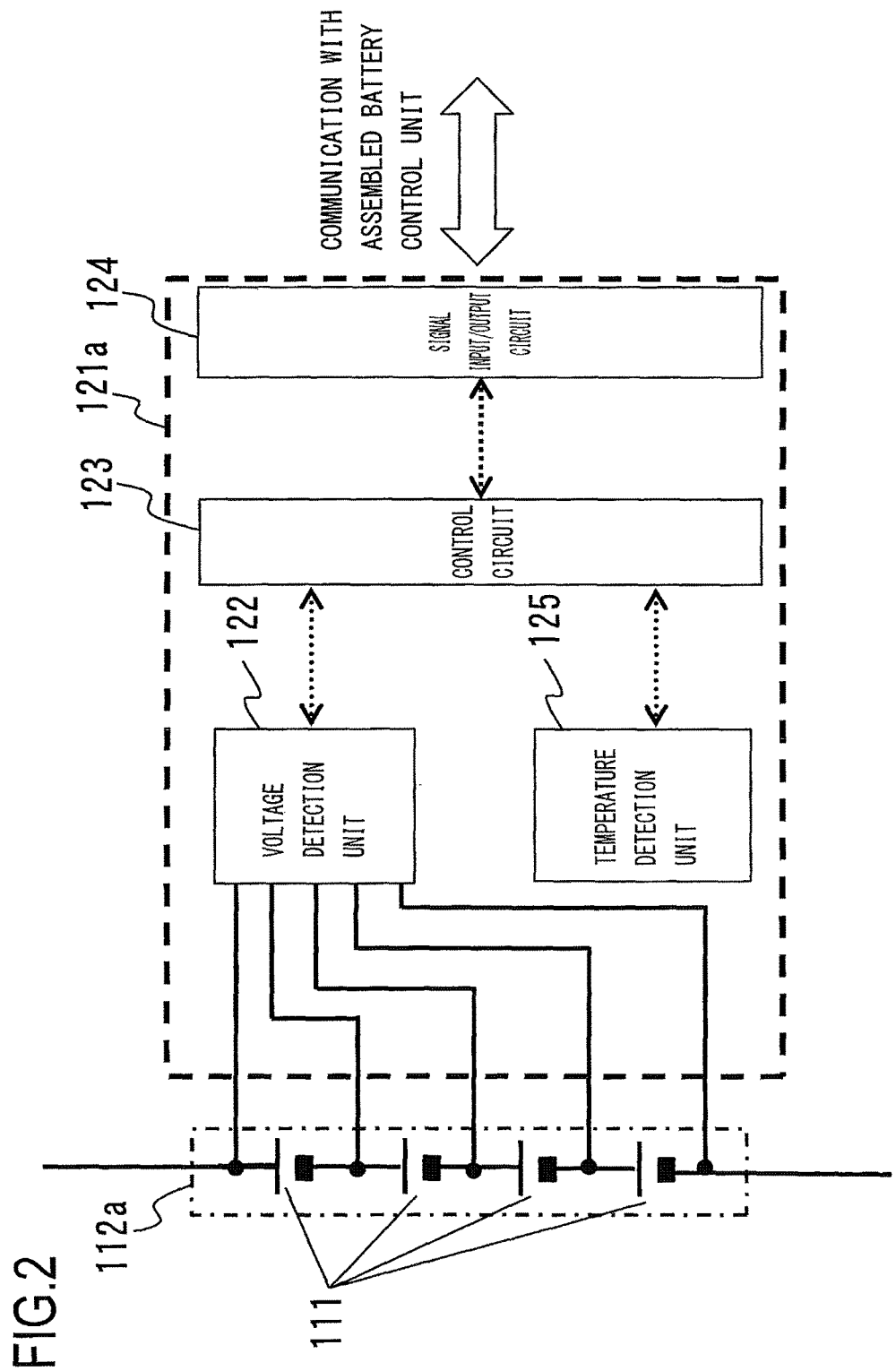

FIG. 2 is a diagram illustrating the circuit structure in the battery cell control unit 121a. As FIG. 2 shows, the battery cell control unit 121a comprises a voltage detection unit 122, a control circuit 123, a signal input/output circuit 124 and a temperature detection unit 125. It is to be noted that the battery cell control unit 121a and the battery cell control unit 121b in FIG. 1 assume circuit structures similar to each other. For this reason, the circuit structure in the battery cell control unit 121a alone is shown as a representative example in FIG. 2.

The voltage detection unit 122 measures the voltage between the terminals at each battery cell 111 (the voltage across each battery cell). The control circuit 123 receives the measurement results provided by the voltage detection unit 122 and the temperature detection unit 125 and transmits the measurement results thus received to the assembled battery control unit 150 via the signal input/output circuit 124. It is to be noted that although not shown in FIG. 2, the battery cell control unit 121a includes an equalizer circuit component of the known art that is used to minimize the variance among voltages and states of charge at the individual battery cells 111, attributable to self discharge, differences in the level of current consumed and the like. The operation of this circuit is controlled by the control circuit 123.

The temperature detection unit 125 in FIG. 2 has a function of measuring the temperature in the battery cell group 112a. The temperature detection unit 125 measures a single temperature for the entire battery cell group 112a and uses the temperature thus measured as a representative temperature value for the temperatures at the individual battery cells 111 forming the battery cell group 112a. The temperature measurement results provided by the temperature detection unit 125 are used for various types of arithmetic operations executed in the assembled battery control unit 150 in order to detect the states of the battery cells 111, the battery cell group 112a and the assembled battery 110. The temperature measured by the temperature detection unit 125 is used as the temperature at the individual battery cells 111 in the battery cell group 112a, as well as the temperature of the battery cell group 112a. In addition, the temperature of the assembled battery 110 may be determined by the assembled battery control unit 150 by, for instance, averaging the temperature of the battery cell group 112a measured by the temperature detection unit 125 in the battery cell control unit 121a and the temperature of the battery cell group 112b measured by the temperature detection unit 125 in the battery cell control unit 121b.

It is to be noted that FIG. 2 shows a single temperature detection unit 125 installed in the battery cell control unit 121a. However, the present invention is not limited to this example and a temperature detection unit 125 may be disposed in correspondence to each battery cell 111 so as to measure the temperature at the particular battery cell 111 and enable the assembled battery control unit 150 to execute various types of arithmetic operations based upon the measurement results corresponding to the individual battery cells. However, it must be borne in mind that a greater number of temperature detection units 125 in this alternative is bound to complicate the structure of the battery cell control unit 121a. As a further alternative, a single temperature detection unit 125 may be installed for the entire assembled battery 110.

It is to be noted that while the temperature detection unit 125 is shown as a single block for schematic representation in FIG. 2, a temperature sensor is installed in conjunction with the battery cell group 112a, i.e., the temperature measurement target, and this temperature sensor outputs the temperature information as a voltage signal in the actual configuration. The control circuit 123 executes an arithmetic operation to determine the temperature of the battery cell group 112a based upon the voltage signal and temperature measurement results for the battery cell group 112a are thus obtained. The temperature measurement results of the arithmetic operation executed by the control circuit 123 are transmitted to the signal input/output circuit 124, which, in turn, outputs the temperature measurement results to a recipient outside the battery cell control unit 121a. The function enabling this flow of processing is included as the temperature detection unit 125 in the battery cell control unit 121a. It is to be noted that the voltage signal output from the temperature sensor may be measured by the voltage detection unit 122 instead.

Figure 3:
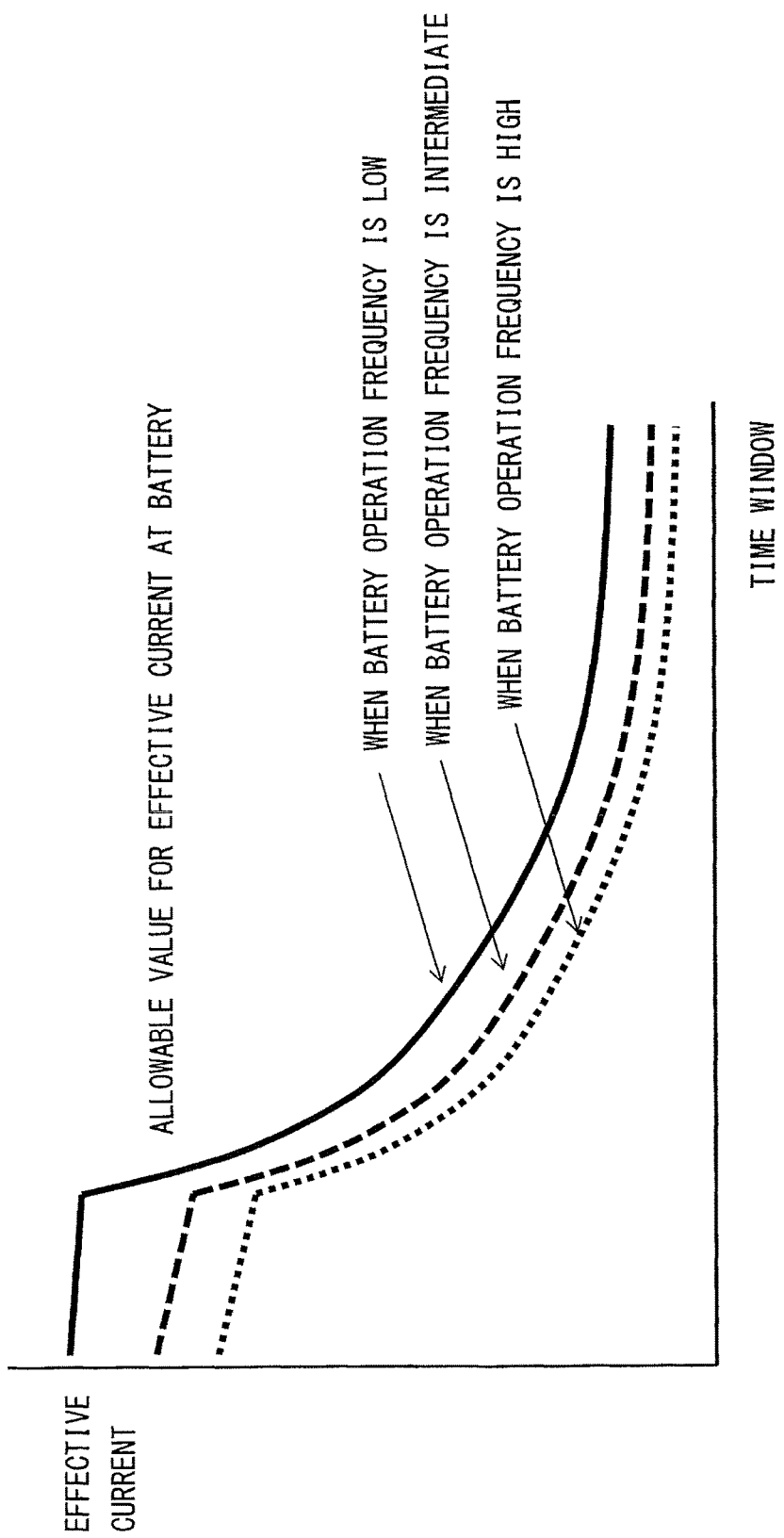

Next, a charge/discharge restriction that may be imposed on the assembled battery 110 will be described. FIG. 3 presents examples of relationships that may be achieved, in correspondence to frequency of use, by the time window and the allowable value pertaining to the effective current (root mean square current) at a standard battery. As shown in FIG. 3, the allowable value for the effective current at the battery changes in correspondence to the frequency with which the battery is used and the time window set for effective current calculation. Namely, as the battery is used more often, or as the time window for effective current calculation extends, the allowable value needs to be set lower since the battery tends to become further degraded under these circumstances.

Figure 4:
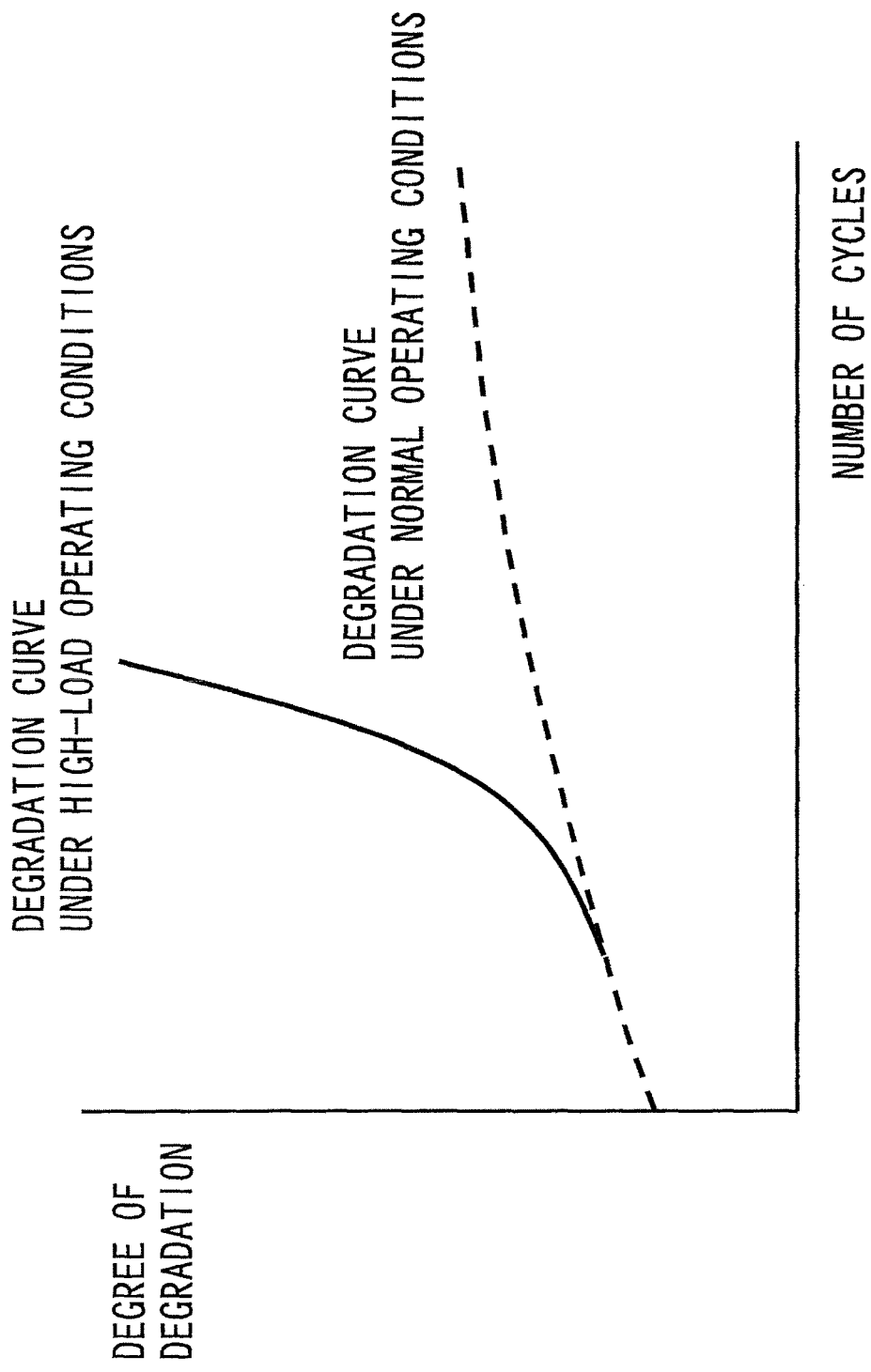

FIG. 4 presents an example of a relationship that may be achieved by the number of battery operation cycles and the extent of degradation. As indicated by the dotted line in FIG. 4, the battery becomes gradually degraded as the number of battery operation cycles increases as long as the effective current remains equal to or less than the allowable value under normal operating conditions. When the battery is used under high-load conditions with the effective current exceeding the allowable value, the internal resistance value temporarily spikes as the number of battery operation cycles increases and thus, the battery appears to become degraded rapidly, as indicated by the solid line in FIG. 4. Under the latter circumstances, the battery can no longer operate at its full performance level.

Accordingly, when the frequency with which the battery is used in high and the assembled battery 110 is repeatedly charged/discharged over an extended period of time, the assembled battery control unit 150 in the battery control system 120 achieved in the embodiment imposes a charge/discharge restriction so as to prevent any decrease in the performance level of the assembled battery 110. The charge/discharge restriction will be described in detail next.

Figure 5:
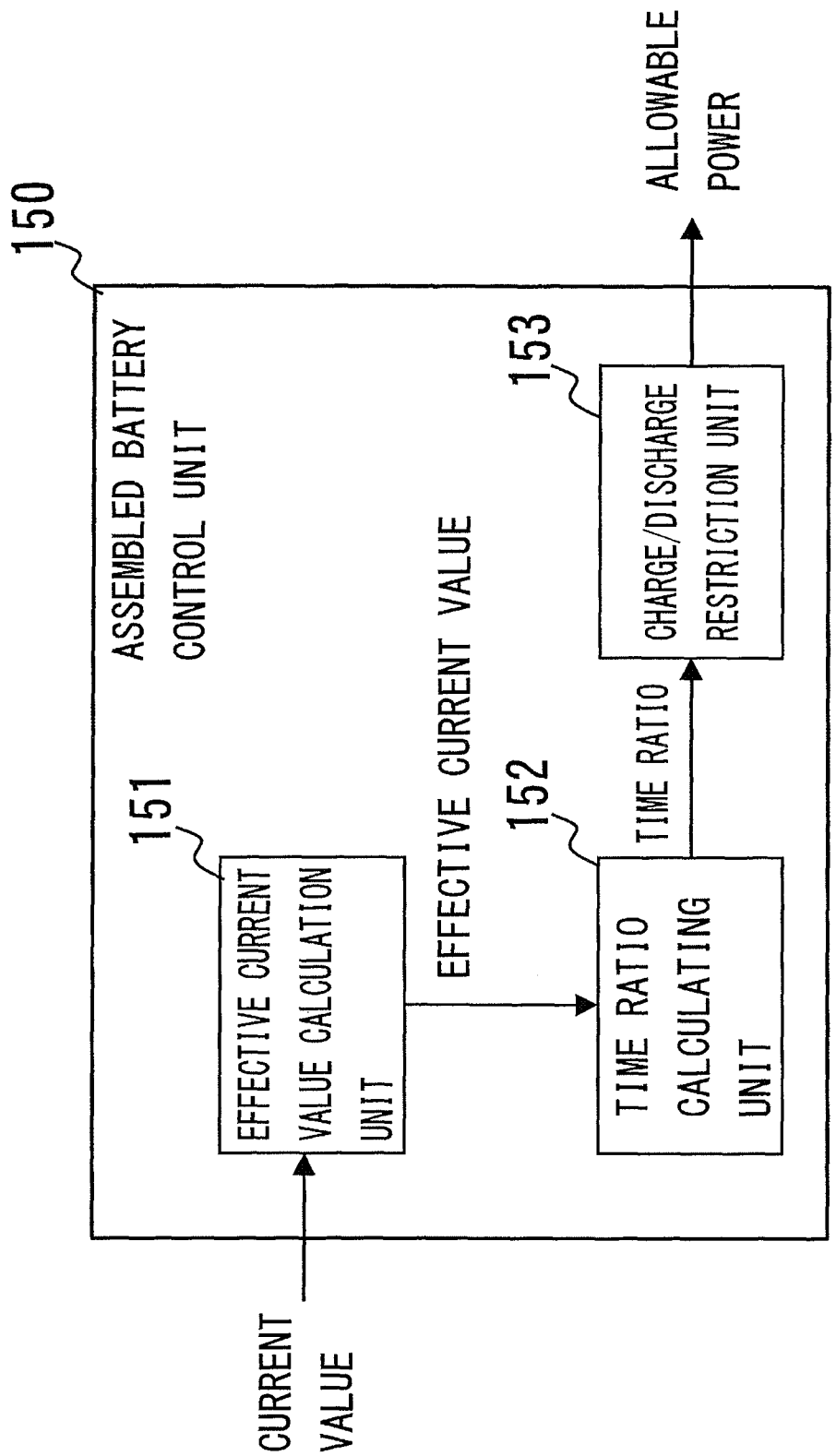

FIG. 5 is a diagram showing the control blocks in the assembled battery control unit 150, which are involved in the charge/discharge restriction. The assembled battery control unit 150 includes the following functional control blocks; an effective current value calculation unit 151, a time ratio calculation unit 152 and a charge/discharge restriction unit 153, as structural elements for enabling the charge/discharge restriction at the assembled battery 110.

The current value for the charge/discharge current at the assembled battery 110, measured by the current detection unit 130, is input to the effective current value calculation unit 151. Based upon the current value input thereto, the effective current value calculation unit 151 calculates an effective current value for the charge/discharge current flowing through the assembled battery 110. The method adopted for the effective current value calculation will be described later in detail. The effective current value calculated by the effective current value calculation unit 151 is output to the time ratio calculation unit 152.

The time ratio calculation unit 152 calculates a time ratio, indicating the ratio of the length of time over which the effective current value has been in excess of a predetermined allowable value during a predetermined specified time period (regulation time period) by comparing the effective current value calculated by the effective current value calculation unit 151 with the allowable value. The time ratio calculated by the time ratio calculation unit 152 is output to the charge/discharge restriction unit 153.

The charge/discharge restriction unit 153 makes a decision, based upon the time ratio output by the time ratio calculation unit 152, as to whether or not to restrict the charge/discharge current at the assembled battery 110. Upon deciding that the charge/discharge current is to be restricted, it determines an allowable power value corresponding to the charge/discharge current subject to the restriction and outputs the value thus determined to the vehicle control unit 200 and to the battery cell control units 121a and 121b. Through this process, a charge/discharge restriction is imposed and the charge/discharge current at the assembled battery 110 is thus restricted.

The control blocks described above enable the assembled battery control unit 150 to impose the charge/discharge restriction at the assembled battery 110. More specifically, it imposes the charge/discharge restriction if the ratio of the length of time over which the effective current value has been in excess of the allowable value during the specified time period is higher than a predetermined threshold value.

Figure 6:
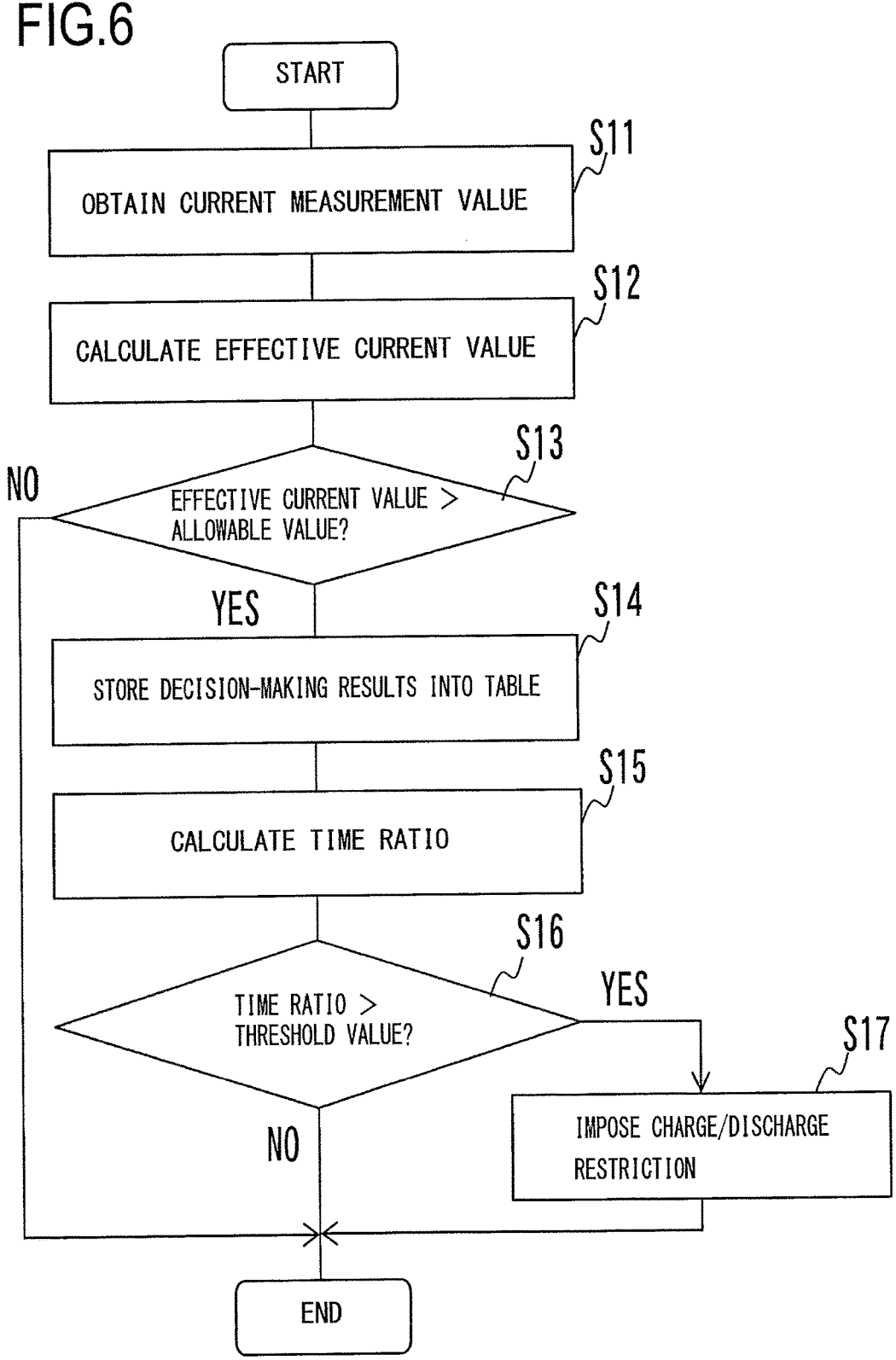

FIG. 6 presents a flowchart of the processing executed to impose the charge/discharge restriction described above. The processing in the flowchart is executed in the assembled battery control unit 150 in each predetermined processing cycle.

In step S11, the assembled battery control unit 150 obtains the current measurement value from the current detection unit 130. A current measurement value, which is output from the current detection unit 130 after each predetermined sampling interval, is obtained and stored in this step.

In step S12, the assembled battery control unit 150 engages the effective current value calculation unit 151 in operation so as to calculate an effective current value in a predetermined time window based upon the current measurement value having been obtained in step S11. The length of the time window may be, for instance, one hour, and in such a case, the effective current value can be calculated by determining the mean square value of the individual current measurement values obtained over the predetermined sampling intervals during the most recent one hour period and calculating the square root of the mean square value. It is to be noted that the time window set for the effective current value calculation executed in step S12 may extend over a length of time other than one hour.

In step S13, the assembled battery control unit 150 engages the time ratio calculation unit 152 in operation so as to compare the effective current value having been calculated in step S12 with the predetermined allowable value. In this step, a decision is made as to whether or not the effective current value is greater than the allowable value set at, for instance, 19 A. If it is decided that the effective current value is greater than the allowable value (19 A), the operation proceeds to step S14, whereas if it is less than the allowable value, the processing in the flowchart presented in FIG. 6 ends.

In step S14, the assembled battery control unit 150 stores the decision-making results obtained through step S13 in a table via the time ratio calculation unit 152. In this step, the contents of a decision-making results table set in advance are updated by newly recording the decision-making results obtained through step S13 into the corresponding field in the decision-making results table. Through this process, information indicating whether or not the effective current value calculated for each specific time window exceeds the allowable value can be recorded in step S14.

FIG. 7 presents an example of such a decision-making results table. In the decision-making results table in the example presented in FIG. 7, decision-making results indicating whether or not the effective current value calculated for the time window extending over one hour are recorded every hour through a period starting 24 hours previous up to the current time point. If the effective current value is judged to be greater than the allowable value in step S13, an "X" is entered in the corresponding field in the decision-making results table in FIG. 7.

By using a decision-making results table such as that shown in FIG. 7, the time ratio calculation unit 152 is able to record, over predetermined time intervals, decision-making results indicating whether or not the effective current value is in excess of the allowable value. It is desirable that if the vehicle system enters an operation OFF state and thus charge/discharge at the assembled battery 110 stops, the effective current value calculation unit 151 calculate the effective current value by assuming that the charge/discharge current in the operation OFF state is zero. As long as the effective current value is calculated in this manner, the time ratio calculation unit 152 is able to make a decision as to whether or not the effective current value exceeds the allowable value calculated by taking into consideration any period of time during which charge/discharge is suspended at the assembled battery 110 and is thus able to continuously record the decision-making results.

In step S15 in FIG. 6, the assembled battery control unit 150 engages the time ratio calculation unit 152 in operation so as to determine the time ratio indicating the ratio of the length of time over which the effective current value has been in excess of the allowable value during the predetermined specified time period by using the decision-making results table described above. In this step, the time ratio can be determined by calculating the ratio of the number of fields where an "X" indicating that the effective current value is greater than the allowable value included in the decision-making results table over a block that is equivalent to the period of time defined by the current time point and a time point preceding the current time point by the length of the specified time period. It is to be noted that the specified time period should be set to a length of time that allows the operation frequency of the assembled battery 110 to be judged correctly when the assembled battery 110 is repeatedly charged and discharged over an extended period of time, and thus may be set to, for instance, 24 hours or more.

For instance, assuming that the specified time period is 24 hours, the ratio of the number of fields where an "X" is entered to indicate that the effective current value is greater than the allowable value to the total of 25 sets of decision-making results having been recorded from 24 hours previous until the current time point is determined. If an "X" is entered for five sets of decision-making results among the 25 sets of decision-making results, the time ratio for the length of time over which the effective current value has been in excess of the allowable value during the specified time period is calculated to be 5/25=0.2 in step S15.

In step S16, the assembled battery control unit 150 engages the charge/discharge restriction unit 153 in operation so as to compare the time ratio determined in step S15 with the predetermined threshold value. If the time ratio is higher than the threshold value, the operation proceeds to step S17, whereas if the time ratio is equal to or less than the threshold value, the processing in the flowchart presented in FIG. 6 ends. It is desirable that the threshold value used in the decision-making executed in step S16 take a value that enables accurate decision-making when the assembled battery 110 is used over an extended period of time, and is repeatedly charged and discharged. Thus, it may be set to, for instance, 0.5 or more.

In step S17, the assembled battery control unit 150 engages the charge/discharge restriction unit 153 in operation in order to impose a charge/discharge restriction on the assembled battery 110. In more specific terms, control is executed so as to ensure that the input/output power at the assembled battery 110 during the charge/discharge operation remains equal to or less than an allowable power value by determining the allowable power value corresponding to the charge/discharge current subject to the restriction and outputting the value thus determined to the vehicle control unit 200 and to the battery cell control units 121a and 121b. Once step S17 has been executed, the assembled battery control unit 150 ends the processing in the flowchart presented in FIG. 6.

Through the processing executed by the assembled battery control unit 150 as described above, the charge/discharge restriction can be imposed on the assembled battery 110.

It is to be noted the charge/discharge restriction imposed in step S17 is not cleared even if a negative decision is made in step S16 in subsequent processing cycle. Rather, it is desirable to clear the charge/discharge restriction on the assembled battery 110 that came into effect in step S17 when a length of elapsed time, calculated to determine the length of time having elapsed since the charge/discharge restriction came into effect in step S17, exceeds a predetermined restriction clearance time. In more specific terms, it may execute control so as to restore the initial setting for the allowable power with regard to the input/output power at the assembled battery 110 during the charge/discharge operation by outputting the allowable power value that was in place before the charge/discharge restriction came into effect in step S17 to the vehicle control unit 200 and to the battery cell control units 121a and 121b.

It is to be noted that in the processing described above, a built-in timer in the assembled battery control unit 150, for instance, may be used to calculate the length of time having elapsed since the charge/discharge restriction came into effect. As an alternative, information indicating the length of time having elapsed since the charge/discharge restriction came into effect may be obtained from the vehicle control unit 200 in FIG. 1 through communication carried out via the CAN mentioned earlier and the length of elapsed time may be calculated based upon the information thus obtained. If there has been a period of time after the charge/discharge restriction came into effect over which the vehicle system has been off and the battery control system 120 has remained a non-operating state, it is desirable that the length of elapsed time calculated in this step include this period.

The following operations and advantages are achieved through the embodiment of the present invention described above.

(1) The battery control system 120 is connected to an assembled battery 110 and controls charge/discharge at the assembled battery 110. The battery control system 120 comprises a current detection unit 130 that measures a current value by detecting an electric current flowing through the assembled battery 110, a voltage detection unit 140 that detects a voltage at the assembled battery 110, a temperature detection unit 125 that detects a temperature at the assembled battery 110 and an assembled battery control unit 150. The assembled battery control unit 150 has functions fulfilled in the form of an effective current value calculation unit 151 that calculates an effective current value in a predetermined time window based upon the current value measured by the current detection unit 130, a time ratio calculation unit 152 that determines a time ratio indicating the ratio of the length of time over which the effective current value has been in excess of a predetermined allowable value during a predetermined specified time period and a charge/discharge restriction unit 153 that restricts the charge/discharge current based upon the time ratio determined by the time ratio calculation unit 152. The structure described above makes it possible to prevent any deterioration in the performance of the assembled battery 110 with a higher level of reliability even when the assembled battery 110 is utilized frequently and is repeatedly charged and discharged over an extended period of time.

(2) The specified time period described above may be set to 24 hours or more. Such a specified time period setting enables accurate decision-making with regard to the operation frequency of the assembled battery 110 when the assembled battery 110 is repeatedly charged and discharged over an extended period of time.

(3) When the time ratio is equal to or greater than, for instance, 0.5, the charge/discharge restriction unit 153 restricts the charge/discharge current (steps S16 and S17). Through these measures, degradation of the assembled battery 110 can be prevented to a certain extent through optimal decision-making executed whenever the assembled battery 110 is used and repeatedly charged and discharged over an extended period of time.

(4) When the length of time having elapsed since the charge/discharge restriction came into effect in step S17 becomes greater than a predetermined restriction clearance time, the charge/discharge restriction unit 153 clears the charge/discharge restriction. As a result, after the charge/discharge restriction is imposed, the initial state can be restored by clearing the charge/discharge restriction with optimal timing.

(5) The battery control system 120 is connected to a CAN, i.e., an in-vehicle communication network. The charge/discharge restriction unit 153 is thus able to obtain information pertaining to the elapsed time length via the CAN as well. This means that the charge/discharge restriction can be cleared with optimal timing even if the battery control system 120 does not have a timer function.

It is to be noted that some or all of the control blocks in the assembled battery control unit 150 shown in FIG. 5, which are involved in the charge/discharge restriction, may be allocated in the vehicle control unit 200. For instance, the function of the effective current value calculation unit 151 may be fulfilled at the assembled battery control unit 150 and the functions of the time ratio calculation unit 152 and the charge/discharge restriction unit 153 may be fulfilled at the vehicle control unit 200. In such a case, the assembled battery control unit 150 transmits information indicating the effective current value calculated by the effective current value calculation unit 151 to the vehicle control unit 200. The vehicle control unit 200 uses the information on the effective current value having been transmitted by the assembled battery control unit 150 so as to calculate, via the time ratio calculation unit 152, the ratio of the length of time over which the effective current value has been in excess of the allowable value. In addition, based upon the time ratio having been determined by the time ratio calculation unit 152, the charge/discharge restriction unit 153 is engaged in operation to make a decision as to whether or not to impose the charge/discharge restriction, and then an instruction for the charge/discharge restriction is issued for the battery control system 120 in correspondence to the decision-making results. Through these alternative measures, operations and advantages similar to those described earlier can be achieved.

The length of the time window for the effective current value calculation, the allowable value to be compared with the calculated effective current values and the like used in the embodiment described above simply represent examples, and the present invention may be adopted in conjunction with other values. In addition, while the effective current value is calculated for a single time window in the embodiment described above, effective current values may be calculated for a plurality of time windows, the effective current values may each be compared with a specific allowable value selected for the corresponding time window and a decision as to whether or not to impose the charge/discharge restriction may be made based upon the comparison results. For instance, any number of time windows extending over time lengths within a range of 10 seconds through 8 hours may be selected, effective current values may be calculated each in correspondence to one of the time windows and the charge/discharge restriction may be imposed based upon the results obtained by comparing the effective current values with the respective allowable values.

In addition, the length of the specified time period in reference to which the time ratio of the time over which the effective current value has been in excess of the allowable value is calculated, the threshold value compared with the time ratio and the like in the embodiment described above are only examples, and the present invention may be adopted in conjunction with other values. Furthermore, while the length of time having elapsed since the charge/discharge restriction came into effect is calculated and a decision is made as to whether or not to clear the charge/discharge restriction by comparing the length of elapsed time with the restriction clearance time in the embodiment described above, a decision as to whether or not to clear the charge/discharge restriction may instead be made by calculating a total length of time over which the charge/discharge restriction has been in effect and comparing this total length of time with the restriction clearance time. In the latter case, if there has been a period of time after the charge/discharge restriction came into effect, over which the vehicle system has been turned off and the battery control system 120 has been, therefore, in a non-operating state, it is desirable to calculate the total length of time by excluding this period.

It is to be noted that the present invention is in no way limited to the particulars of the embodiment and variations thereof described above, and any other mode conceivable within the technical range of the present invention should be considered to be within the scope of the present invention.

In addition, all or some of the various structural elements and the various functions described above may be achieved in hardware by using, for instance, an integrated circuit or as a program or software executed by a processor. Information such as a program, a table and the like, needed to enable the various functions, may be stored in a storage device such as a memory or a hard disk, or in a storage medium such as an IC card or a DVD.

The disclosure of the following priority application is herein incorporated by reference:
Japanese Patent Application No. 2013-166801, filed Aug. 9, 2013

REFERENCE SIGNS LIST

100: battery system, 110: assembled battery, 111: battery cell, 112a, 112b: battery cell group, 120: battery control system, 121a, 121b: battery cell control unit, 122: voltage detection unit, 123: control circuit, 124: signal input/output circuit, 125: temperature detection unit, 130: current detection unit, 140: voltage detection unit, 150: assembled battery control unit, 151: effective current value calculation unit, 152: time ratio calculation unit, 153: charge/discharge restriction unit, 160: signal communication path, 170: insulator element, 180: storage unit, 200: vehicle control unit, 300, 310, 320, 330: relay, 400: inverter, 410: motor generator, 420: charger

The invention claimed is:

1. A battery control system connected to a battery, which controls charge/discharge at the battery, comprising:
    a current detection unit that measures a current value by detecting a charge/discharge current flowing through the battery;
    a voltage detection unit that detects a voltage at the battery;
    a temperature detection unit that detects a temperature at the battery;
    an effective current value calculation unit that calculates, based upon the current value measured by the current detection unit, an effective current value in a predetermined time window;
    a time ratio calculation unit that determines a time ratio indicating a ratio of a length of time over which the effective current value has been in excess of a predetermined allowable value during a predetermined specified time period; and
    a charge/discharge restriction unit that restricts the charge/discharge current based upon the time ratio determined by the time ratio calculation unit.

2. The battery control system according to claim 1, wherein:
    the specified time period is at least 24 hours.

3. The battery control system according to claim 1, wherein:
    the charge/discharge restriction unit restricts the charge/discharge current when the time ratio is equal to or greater than 0.5.

4. The battery control system according to claim 1, wherein:
    the charge/discharge restriction unit clears restriction on the charge/discharge current once a length of elapsed time having elapsed since the restriction on the charge/discharge current came into effect or a total length of time over which the restriction on the charge/discharge current has been in effect exceeds a predetermined restriction clearance time.

5. The battery control system according to claim 4, wherein:
    the battery control system is connected to an in-vehicle communication network; and
    the charge/discharge restriction unit obtains information pertaining to the length of elapsed time or the total length of time via the communication network.

6. A vehicle control system, comprising:
    a battery control system connected to a battery, which controls charge/discharge at the battery; and
    a vehicle control unit connected with the battery control system, wherein:
    the battery control system includes a current detection unit that measures a current value by detecting a charge/discharge current flowing through the battery, a voltage detection unit that detects a voltage at the battery, a temperature detection unit that detects a temperature at the battery and an effective current value calculation unit that calculates, based upon the current value measured by the current detection unit, an effective current value in a predetermined time window; and
    the vehicle control unit determines a time ratio indicating a ratio of a length of time over which the effective current value has been in excess of a predetermined allowable value during a predetermined specified time period and issues an instruction for the battery control system so as to restrict the charge/discharge current based upon the time ratio having been determined.

* * * * *